US010118136B2

(12) United States Patent
Ungerank et al.

(10) Patent No.: US 10,118,136 B2
(45) Date of Patent: Nov. 6, 2018

(54) POLYIMIDE MEMBRANES MADE OF POLYMERIZATION SOLUTIONS

(71) Applicants: Markus Ungerank, Perg (AT); Goetz Baumgarten, Haltern am See (DE)

(72) Inventors: Markus Ungerank, Perg (AT); Goetz Baumgarten, Haltern am See (DE)

(73) Assignee: Evonik Fibres GmbH, Lenzing (AT)

( * ) Notice: Subject to any disclaimer, the term of this patent is extended or adjusted under 35 U.S.C. 154(b) by 0 days.

(21) Appl. No.: 15/203,649

(22) Filed: Jul. 6, 2016

(65) Prior Publication Data

US 2016/0310912 A1  Oct. 27, 2016

Related U.S. Application Data

(63) Continuation of application No. 13/384,685, filed as application No. PCT/EP2010/060648 on Jul. 22, 2010.

(30) Foreign Application Priority Data

Jul. 23, 2009  (AT) .............................. A 1164/2009

(51) Int. Cl.
| | | |
|---|---|---|
| B01D 71/64 | (2006.01) | |
| B01D 67/00 | (2006.01) | |
| B01D 69/08 | (2006.01) | |
| B01D 53/22 | (2006.01) | |
| C08G 73/10 | (2006.01) | |
| C08L 79/08 | (2006.01) | |

(52) U.S. Cl.
CPC ........... *B01D 71/64* (2013.01); *B01D 53/228* (2013.01); *B01D 67/0009* (2013.01); *B01D 67/0011* (2013.01); *B01D 67/0013* (2013.01); *B01D 69/087* (2013.01); *C08G 73/1042* (2013.01); *C08G 73/1067* (2013.01); *C08L 79/08* (2013.01); *B01D 2323/18* (2013.01); *B01D 2325/022* (2013.01)

(58) Field of Classification Search
CPC ........... C08G 73/1067; C08G 73/1042; B01D 71/64; B01D 53/228; B01D 67/0013; B01D 67/0011; B01D 69/087; B01D 2323/18; B01D 2325/022; B01D 67/0009; C08L 79/08
See application file for complete search history.

(56) References Cited

U.S. PATENT DOCUMENTS

| | | | |
|---|---|---|---|
| 3,708,458 | A | 1/1973 | Alberino et al. |
| 4,061,623 | A | 12/1977 | Onder |
| 4,952,319 | A | 8/1990 | Yanaga et al. |
| 5,055,116 | A | 10/1991 | Kohn et al. |
| 5,074,891 | A | 12/1991 | Kohn et al. |
| 5,202,411 | A | 4/1993 | Itatani |
| 5,635,067 | A | 6/1997 | Macheras |
| 5,635,097 | A | 6/1997 | Aiello |
| 6,180,008 | B1 | 1/2001 | White |
| 6,482,992 | B2 | 11/2002 | Scholz et al. |
| 6,500,991 | B2 | 12/2002 | Wiese et al. |
| 6,960,699 | B2 | 11/2005 | Tötsch et al. |
| 7,018,445 | B2 | 3/2006 | Simmons et al. |
| 7,138,552 | B2 | 11/2006 | Kaizik et al. |
| 7,154,012 | B2 | 12/2006 | Lueken et al. |
| 7,179,947 | B2 | 2/2007 | Lueken et al. |
| 7,193,116 | B2 | 3/2007 | Moeller et al. |
| 7,232,931 | B2 | 6/2007 | Toetsch et al. |
| 7,317,130 | B2 | 1/2008 | Möller et al. |
| 8,129,571 | B2 | 3/2012 | Lueken et al. |
| 8,138,379 | B2 | 3/2012 | Lueken et al. |
| 8,226,829 | B2 | 7/2012 | Wiese et al. |
| 8,404,902 | B2 | 3/2013 | Kreidler et al. |
| 8,461,394 | B2 | 6/2013 | Lueken et al. |
| 8,748,643 | B2 | 6/2014 | Priske et al. |
| 8,999,038 | B2 | 4/2015 | Ungerank et al. |
| 2004/0159233 | A1 | 8/2004 | Simmons et al. |
| 2004/0177753 | A1 | 9/2004 | Chung et al. |
| 2006/0196355 | A1 | 9/2006 | Ekiner et al. |
| 2007/0135665 | A1 | 6/2007 | Wiese et al. |
| 2008/0017029 | A1 | 1/2008 | Kase et al. |
| 2008/0134885 | A1 | 6/2008 | Yoshinaga et al. |
| 2009/0032465 | A1 | 2/2009 | Baumgarten et al. |
| 2012/0046503 | A1 | 2/2012 | Priske et al. |
| 2012/0123079 | A1 | 5/2012 | Ungerank et al. |
| 2012/0279922 | A1 | 11/2012 | Haensel et al. |

FOREIGN PATENT DOCUMENTS

| | | |
|---|---|---|
| EP | 0 321 569 A1 | 6/1989 |
| EP | 0 410 793 | 1/1991 |
| EP | 1 457 253 | 9/2004 |
| GB | 2 437 519 A | 10/2007 |
| JP | 62-231017 A | 10/1987 |
| JP | 63-175115 | 7/1988 |
| JP | 03-038229 | 2/1991 |
| JP | 05-271460 | 10/1993 |

(Continued)

OTHER PUBLICATIONS

International Search Report dated Nov. 19, 2010 in PCT/EP10/060648 filed on Jul. 22, 2010.
European Search Report dated Jan. 31, 2013 in Patent Application No. 12183794.2 with English Translation of Category of Cited Documents.
Combined Chinese Office Action and Search Report dated Oct. 31, 2013 in Patent Application No. 201080032551.6 (with English language translation).
Office Action dated Jun. 2, 2014 in Japanese Patent Application No. 2012-521042 (submitting English language translation only).

(Continued)

*Primary Examiner* — Rabon A Sergent
(74) *Attorney, Agent, or Firm* — Oblon, McClelland, Maier & Neustadt, L.L.P.

(57) ABSTRACT

The invention relates to polyimide membranes and to a phase inversion method for the production thereof. The polyimide membranes can be used to separate different gas mixtures.

14 Claims, 3 Drawing Sheets

(56) References Cited

FOREIGN PATENT DOCUMENTS

| JP | 8-257381 A | 10/1996 |
|---|---|---|
| JP | 08-257381 A | 10/1996 |
| JP | 09-173801 | 7/1997 |
| JP | 11-192420 | 7/1999 |
| JP | 2006-507939 A | 3/2006 |
| WO | WO 2004/050223 A2 | 6/2004 |
| WO | WO 2006/068626 A1 | 6/2006 |
| WO | WO2007/125367 A1 | 11/2007 |

OTHER PUBLICATIONS

Membrane Formation by Phase Inversion in Multicomponent Polymer Systems, Mechanisms and Morphologies, Apr. 23, 1968.
Phase Inversion Membranes and Immersion Precipitation, Membranes 101, Synder Filtration, Inc., 2015.
Observations by Third Party (Translation Only), Feb. 25, 2015.
van de Witte, P, et al., Phase Separation Processes in Polymer Solutions in Relation to Membrane Formation, *Journal of Membrane Science*, vol. 117, 1966, pp. 1-31.
English Translation of the Internal Reconsideration Report drafted Oct. 26, 2015 in Appeal No. 2015-014112, Japanese Patent Application No. 2012-521042.
Young, Tai-Horng, "Pore Formation Mechanism of Membranes From Phase Inversion Process," *Desalination*, vol. 103, 1995, pp. 233-247.
Report of Reconsideration by Examiner before Appeal drafted Oct. 26, 2015 (Appeal No. 2015-014112) in Japanese Patent Application No. 2012-521042 filed Jul. 22, 2010 with machine generated English translation.
Canadian Office Action dated Sep. 25, 2017 in Patent Application No. 2,749,033.

HFS#34 fiber cross section 500x

HSF#42 fiber cross section 500x

Figure 3:

POLYIMIDE MEMBRANES MADE OF POLYMERIZATION SOLUTIONS

CROSS REFERENCE TO RELATED APPLICATIONS

This application is a continuation application of U.S. application Ser. No. 13/384,685, filed Jan. 18, 2012, the disclosure of which is incorporated herein by reference in its entirety. The parent application is the National Stage of PCT/EP10/060648, filed Jul. 22, 2010, the disclosure of which is incorporated herein by reference in its entirety. The parent application claims priority to Austrian Application No. A1164/2009, filed Jul. 23, 2009, the disclosure of which is incorporated herein by reference in its entirety.

FIELD OF INVENTION

The invention concerns polyimide membranes produced directly from a polyimide polymerization solution without the polyimide having been isolated in the form of a solid material, particularly not as dried solid material and more particularly not as dried powder, and then redissolved. The polyimide membranes concerning the invention can be either flat sheet membranes or hollow fiber membranes. The polyimide membranes can be not only porous membranes in the form of micro-, ultra- or nanofiltration membranes but also aporous membranes for separation of gases. All the membranes are integrally asymmetrical membranes and are produced by a phase inversion process.

OBJECT

This invention has for its object to provide a production process for polyimides that does not use any substances which would be a disruptive influence in the subsequent membrane production process. It further has for its object that the process provided by the invention shall make it possible to produce membranes having sufficient mechanical properties.

Further objects, not explicitly mentioned, will become apparent from the overall context of the ensuing description, examples and claims.

PRIOR ART

The production of phase inversion membranes generally requires polymers that are soluble in conventional water-miscible solvents. This process is currently being used to produce thousands of metric tons of polyether sulfone membranes. Possible solvents include inter alia but not exclusively dimethylformamide (DMF), dimethylacetamide or N-methylpyrrolidone. Many additives such as cosolvents, nonsolvents, pore-formers, hydrophilicizers etc are admixed in order to influence the properties of the membranes. The starting point for this is usually a pellet material, the casting solution being produced by pasting up with the solvents and the additives. Success in membrane production, as elsewhere, depends decisively on the molar mass and the distribution of the polymer used. In general, polymers with high molar masses and narrow distribution are required.

P84 is a polymer which is well known in the literature and is used for the production of flat sheet membranes and hollow fiber membranes (US 2006/0156920, WO 04050223, U.S. Pat. No. 7,018,445, U.S. Pat. No. 5,635,067, EP 1457253, U.S. Pat. No. 7,169,885, US 2004/0177753, U.S. Pat. No. 7,025,804). P84 is marketed in 2 modifications (P84 type 70 and P84 HT) in powder form by HP Polymer of Lenzing in Austria. The customers then redissolve this powder in aprotic dipolar solvents and admix it with additives. Membranes can then be produced therefrom. However, various customers (e.g., Air Liquide Medal, US 2006/156920) report that the films and membranes produced therefrom are very brittle and only blends with other polymers lead to stable films and hollow fiber membranes. The powder has to be subjected to a special treatment to have sufficiently high molar masses (Air Liquide WO 2006/092677). For this, the treatment time and the method are very important. The result is powders having slightly different properties but which produce casting solutions having different viscosities. Therefore, uniform production of polymer membranes is only possible with great difficulty.

P84 is also made into a blend with other polymers (US 2006/156920), so that the membranes produced therefrom have sufficiently high stabilities. But the disadvantage here is that very good separation properties for gases, plasticization stabilities to $CO_2$ and chemical stabilities to many solvents are in part disruptively influenced, or even destroyed, by admixing other polymers.

The cause for the low molar mass resides in the production process of the P84 powder. It is at this stage that the polymer loses molar mass. The molar masses directly after polymerization and after production of the powder are depicted in Table 1.

TABLE 1

Molar masses after polymerization and after powder production of P84 type 70 and P84 HAT

| Type | | Directly after polymerization in solution (g·mol−1) | After conversion into powder (g·mol−1) |
|---|---|---|---|
| P84 type 70 | Mn | 76 600 g | 56 200 |
| | Mw | 146 200 | 101 500 |
| | Mp | 130 500 | 93 500 |
| | PDI | 1.91 | 1.81 |
| P84 HT | Mn | 75 500 | 52 200 |
| | Mw | 150 900 | 84 200 |
| | Mp | 122 200 | 84 100 |
| | PDI | 2.00 | 1.61 |

It is clearly apparent that the polymer loses molar mass in the course of conversion from the polymerization solution into the powder by a precipitation process.

P84 powder is also used for the production of flat sheet membranes (WO 2007/125367, WO 2000/06293). There are the same problems here as in the production of hollow fiber membranes.

Measuring Technique

Viscosity Determination

Dynamic viscosity η is ascertained by shearing the polymer solution in a cylindrical gap at a constant 25° C. once by mandating various rotation rates Ω (or shear gradients γ) and then by mandating various shear stresses τ.

The measuring instrument used is a HAAKE RS 600 with a liquid-heatable measuring cup receiver TEF/Z28, a cylindrical rotor Z25DIN53019/ISO3219 and a disposable aluminum measuring cup Z25E/D=28 mm.

The shear stress τ is measured at a particular shear gradient. Dynamic viscosity η computes from ensuing formulae and is reported at a shear gradient of 10 $s^{-1}$ in Pa·s.

Viscosity Function Proper $$\frac{\tau}{\gamma} = \eta * \gamma^2$$

Shear Gradient $\gamma = M*\Omega$ $\tau$ . . . Shear stress
$\eta$ . . . Dynam. viscosity
M . . . Shear factor of rotor: 12350 rad/s
$\Omega$ . . . Angular viscosity Molar Mass Determination Molar mass is determined using a gel permeation chromatography system. The system is calibrated with polystyrene standards. The molar masses reported are therefore to be understood as relative molar masses.

Components and settings used were as follows:

| HPLC | WATERS 600 pump, 717 autoinjector, 2487 UV detector |
|---|---|
| Precolumn | PSS SDV precolumn |
| Columns | PSS SDV 10 μm 1000, $10^5$ and $10^6$ Å |
| Eluent | 0.01M LiBr + 0.03M $H_3PO_4$ in DMF (sterile-filtered, 0.45 μm) |
| Flux | 1.0 ml/min |
| Run time | 45 min |
| Pressure | ~1.550 psi |
| Wavelength | 270 nm (with use of UV detector) |
| Injection volume | 50 μl or 20 μl (for solutions c >1 g/l) |
| Standards | PS (polystyrene) standards (narrow distribution, 300-3☐$10^6$, PSS) |

Permeabilities

Gas permeabilities for films are reported in barrens ($10^{-10}$ $cm^3 \cdot cm^{-2} \cdot cm \cdot s^{-1} \cdot cmHg^{-1}$). Permeances of hollow fibers or flat sheet membranes to gases are reported in GPU (Gas Permeation Unit, $10^{-6}$ $cm^3 \cdot cm^{-2} \cdot s^{-1} \cdot cmHg^{-1}$). The fluxes of nano- and ultrafiltration membranes are reported in $l \cdot m^{-2} \cdot h^{-1} \cdot bar^{-1}$.

Gas Permeabilities

Permeabilities to gases are measured by the pressure rise method. A flat sheet film between 10 and 70μ in thickness has a gas or gas mixture applied to it from one side. On the other side, the permeate side, there is a vacuum (ca. $10^{-2}$ mbar) at the start of the test. Then, pressure rise on the permeate side over time is reported.

The polymer's permeability can be computed by the following formula:

$$P = \frac{V_{dead} \cdot MW_{gas} \cdot l}{\rho \cdot R \cdot T \cdot A \cdot \Delta p} \cdot \frac{dp}{dt} \cdot 10^{10}$$

P . . . Permeability in barriers ($10^{-10}$ $cm^3 \cdot cm^{-2} \cdot cm \cdot s^{-1} \cdot cmHg^{-1}$)
$V_{dead}$ . . . Volume of permeate side in $cm^3$
$MW_{gas}$ . . . Molar mass of gas in $g \cdot mol^{-1}$
l . . . Layer thickness of film in cm
$\rho$ . . . Density of gas in $g \cdot cm^{-3}$
R . . . Gas constant in $cm^3 \cdot cmHg \cdot K^{-1} \cdot mol^{-1}$
T . . . Temperature in kelvins
A . . . Area of film in $cm^2$
$\Delta p$ . . . Pressure difference between feed and permeate side in cmHg dp/dt. Pressure rise per time on permeate side in $cmHg \cdot s^{-1}$ The permeability of hollow fibers is measured using the same pressure rise method.

Permeance is computed by the following formula:

$$p = \frac{V_{dead} \cdot MW_{gas}}{\rho \cdot R \cdot T \cdot A \cdot \Delta p} \cdot \frac{dp}{dt} \cdot 10^6$$

P . . . Permeance in GPU (gas permeation units. $10^{-6}$ $cm^3 \cdot cm^{-2} \cdot cm \cdot s^{-1} \cdot cmHg^{-1}$)
$V_{dead}$ . . . Volume of permeate side in $cm^3$
$MW_{gas}$ . . . Molar mass of gas in $g \cdot mol^{-1}$
$\rho$ . . . Density of gas in $g \cdot cm^{-3}$
R . . . Gas constant in $cm^3 \cdot cmHg \cdot K^{-1} \cdot mol^{-1}$
T . . . Temperature in kelvins
A . . . External area of hollow fiber in $cm^2$
$\Delta p$ . . . Pressure difference between feed and permeate side in cmHg
dp/dt. Pressure rise per time on permeate side in $cmHg \cdot s^{-1}$ The selectivities of various pairs of gases are pure-gas selectivities. The selectivity between two gases computes from the ratio of permeabilities:

$$S = \frac{P_1}{P_2}$$

S . . . ideal gas selectivity
$P_1$ . . . permeability or permeance of gas 1
$P_2$ . . . permeability or permeance of gas 2

Liquid Permeances

Permeances of flat sheet membranes are determined using a Milipore stirred cell pressurized with 5 to 6 bar of nitrogen. What is measured is permeate flux per unit time at a defined pressure. Permeance is given by:

$$p = \frac{v}{\Delta p \cdot A}$$

P . . . Permeance in $l \cdot m^{-2} \cdot h^{-1} \cdot bar^{-1}$
v . . . Volume stream in $l \cdot h^{-1}$
$\Delta p$ . . . Pressure difference between feed and permeate side in bar
A . . . Filtration area in $m^2$ Retention R is obtained from the following formula:

$$R = \left(1 - \frac{C_P}{C_F}\right) \cdot 100$$

R . . . Retention in %
$C_P$ . . . Concentration of dissolved product in permeate
$C_F$ . . . Concentration of dissolved product in feed When retention is 100%, the entire product is retained by the membrane. When retention is 0%, the membrane lets the entire dissolved product through.

Solution to Problem

The problem of molar mass degradation in the production of P84 powder is circumvented by the polymer after the polymerization in an aprotic dipolar solvent not being isolated in the form of a solid material, particularly not as dried solid material and more particularly not as dried powder, but instead the polymerization solution being used directly for producing the membranes.

The membrane production process involves the following subsidiary steps:
a) polymerization
b) producing the casting solution
c) membrane production Polymerization The polyimides are produced via a polycondensation of an aromatic tetracarboxylic anhydride with an aromatic diisocyanate by release of carbon dioxide. Preferably used substances and combinations thereof are described hereinbelow:

Dianhydrides:
3,4,3',4'-benzophenonetetracarboxylic dianhydride, 1,2,4,5-benzenetetracarboxylic dianhydride, 3,4,3',4'-biphenyltetracarboxylic dianhydride, oxydiphthalic dianhydride, sulfonyldiphthalic dianhydride, 1,1,1,3,3,3-hexafluoro-2,2-propylidenediphthalic dianhydride Diisocyanates:
2,4-tolylene diisocyanate, 2,6-tolylene diisocyanate, 4,4'-methylenediphenyl diisocyanate, 2,4,6-trimethyl-1,3-phenylene diisocyanate, 2,3,4,5-tetramethyl-1,4-phenylene diisocyanate The polymerization takes place in an aprotic dipolar solvent. Dimethylformamide, dimethylacetamide, N-methylpyrrolidone, N-ethylpyrrolidone and sulfolane are used preferably but not exclusively singly or in mixtures.

This involves the aromatic dianhydride or mixtures of aromatic dianhydrides being dissolved in concentrations of 10% by weight to 40% by weight, preferably between 18% by weight and 32% by weight and more preferably between 22% by weight and 28% by weight in an aprotic dipolar solvent and heated to from 50° C. to 150° C., preferably 70° C. to 120° C. and more preferably to from 80° C. to 100° C. This solution is admixed with 0.01% by weight to 5% by weight, preferably 0.05% by weight to 1% by weight and more preferably 0.1% by weight to 0.3% by weight of a basic catalyst. Useful catalysts include:

Alkali or alkaline earth metal hydroxides, methoxides, ethoxides, carbonates and phosphates such as for example but not exclusively sodium hydroxide, potassium hydroxide, sodium methoxide, potassium methoxide, sodium ethoxide, potassium ethoxide, sodium carbonate, sodium bicarbonate, potassium carbonate, potassium bicarbonate, potassium phosphate, potassium hydrogenphosphate, potassium dihydrogenphosphate Tertiary amines such as for example but not exclusively: trimethylamine, triethylamine, tripropylamine, diazabicycloundecane, diazabicyclooctane, dimethylaminopyridine.

The diisocyanate is then added over a period of 1 to 25 hours, preferably 3 to 15 hours and more preferably 5 to 10 hours.

Particular preference is given to producing the following polyimides:

R is selected from the group consisting of x,y: mole fraction with 0<x<0.5 and 1>y>0.5

The result is a clear golden yellow to dark brown polymer solution having a viscosity between 1 and 300 Pa·s, preferably 20 to 150 Pa·s and more preferably 40 to 90 Pa·s. The molar masses Mp are greater than 100 000 g·mol$^{-1}$ and therefore differ distinctly from the polyimide polymer powders, especially the P84 polymer powders.

The polyimide polymer of the present invention is obtained after the reaction as a solute in an aprotic dipolar solvent. There are no disruptive concomitants or by-products in the polymer solution. The viscosity is very high and suitable for production of membranes. For that reason, it is also economically advantageous for the polymer not to be precipitated and then redissolved in the same solvent. The solutions are therefore used directly—without isolating the polymer and preferably also without any other further treatment—for producing the casting solution.

Producing the Casting Solution

The polymer solutions obtained from the polymer condensation have a solids content between 22% by weight and 28% by weight and can be used for producing the casting solution without further treatment.

The casting solution of the present invention is notable for the following properties:

It has a sufficiently high viscosity for production of flat sheet and hollow fiber membranes It may contain additives to prevent the formation of large voids (macrovoids) in the membranes It may contain volatile solvents to produce a surface having the desired pore size Casting solution viscosity is ideal when it corresponds to the entanglement point in viscosity plotted as a function of solids content. This point is that point where the function of viscosity versus solids turns from linear to exponential. This point is also very highly dependent on molar mass. The higher the molar mass, the lower the solids content at which entanglement occurs.

In respect of viscosity, molar mass and molar mass distribution, the casting solutions obtainable via the process according to the present invention differ distinctly from the casting solutions of the prior art. It is only the process of the present invention that provides casting solutions combining a high viscosity with a high molar mass and a narrow molar mass distribution for the polyimide. The processes of the present invention thus make it possible to obtain membranes that have outstanding mechanical properties.

The processes of the prior art, i.e., dissolving pulverulent polyimides with subsequent aftertreatment to raise the molar mass, cannot be used to obtain any casting solutions having comparable combinations of properties.

The process of the present invention also makes it possible to add additives. Various amounts of additives result in different solids contents, which would then shift the entanglement point. Modulating the molar mass in the polymerization can be used to shift this entanglement point again.

As the casting solution composition moves very far away from the concentration at which phase separation takes place, the gradient between solvent and nonsolvent becomes very large in membrane production by phase inversion, and large voids are obtained in the membranes. These voids, which are also known as macrovoids, are responsible for lower stability of the membranes to pressure in use, and limit their usefulness for example in use in natural gas cleanup. The formation of macrovoids can be prevented by addition of nonsolvents. Suitable for this are the following water-miscible solvents or mixtures thereof.

This list is only illustrative, the practiced artisan will readily think of even more solvents.

alcohols such as for example methanol, ethanol, isopropanol, propanol, butanol, butanediol, glycerol,
  water,
  ketones such as for example acetone or butanone To produce a defined surface on the membrane, several methods can be used in principle: As well as the delayed demixing method, evaporative removal of volatile cosolvents will also lead to very thin selective layers not only in the gas separation membrane sector but also in the nano- and ultrafiltration membrane sector. The degree of evaporative removal and hence the pore size is influenced by the species of volatile solvent, its concentration, the evaporation time, the casting solution temperature, the amount and temperature of ambient gas in the evaporative removal zone.

Useful volatile solvents include the following. They should be water miscible, for example acetone, tetrahydrofuran, methanol, ethanol, propanol, isopropanol, dioxane, diethyl ether.

Producing the casting solution is preferably effected by adding additives by metered addition of the mixture of additives or separately from each other in succession. The additives are gradually metered into the mixture under agitation. The metered addition takes between 10 min and 3 hours for preference and between 30 min and 2 hours for particular preference. Adding the cosolvents causes partial precipitation of polyimide at the drop entry point. But the solids dissolve again after a few minutes without leaving a residue. The clear solution is then additionally filtered through a 15μ steel mesh sieve in order to remove destructive concomitants which would lead to imperfections in the membrane surface.

After filtration, the solution is left to stand in a sealed container at 50° C. for 2 days for removal of air bubbles and hence devolatilization.

Producing the Hollow Fibers

The devolatilized, filtered and additivized polyimide polymer solution is thermostated—preferably to from 20 to 100° C. and more preferably to from 30 to 70° C. The solution is gear pumped through the outer part of a two-material die. The external diameter of the two-material die is 600 μm, the internal diameter is 160 μm, pump rate is between 1.3 and 13.5 ml/min. A liquid mixture of water and one or more than one aprotic dipolar solvent in admixture is pumped in the inner part of the two-material die.

Useful solvents include inter alia but not exclusively dimethylformamide, dimethylacetamide, N-methylpyrrolidone, N-ethylpyrrolidone, sulfolane or dimethyl sulfoxide.

The composition is between solvent and water is between 10% by weight and 95% by weight of solvent and 90% by weight and 5% by weight of water, preferably between 30% by weight and 90% by weight of solvent and 70% by weight and 10% by weight of water and more preferably between 50% by weight and 80% by weight of solvent and 50% by weight and 20% by weight of water. Pump rate is between 0.2 ml/min and 10 ml/min.

The resulting hollow fiber then enters a tube flooded with a dry thermostated gas. Useful gases include: nitrogen, air, argon, helium, carbon dioxide, methane or other industrial inert gases. Gas temperature is adjusted via a heat exchanger and is preferably between 20 and 250° C., more preferably between 30 and 150° C. and even more preferably between 40 and 120° C.

Gas velocity in the tube is preferably between 0.1 and 10 m/min, more preferably between 0.5 and 5 m/min and even more preferably between 1 and 3 m/min. The distance and hence tube length is preferably between 5 cm and one meter and more preferably between 10 and 50 cm. The thread thus conditioned then dips into a water bath to coagulate the polymer mass and thus form the membrane. Water bath temperature is preferably between 1 and 60° C., more preferably between 5 and 30° C. and more preferably between 8 and 16° C.

The concentration of aprotic dipolar and other solvents such as for example but not exclusively dimethylformamide, dimethylacetamide, N-methylpyrrolidone, N-ethylpyrrolidone, sulfolane, dimethyl sulfoxide, tetrahydrofuran, dioxane, isopropanol, ethanol or glycerol in the coagulation bath is between 0.01% by weight and 20% by weight, preferably between 0.1% by weight and 10% by weight and more preferably between 0.2% by weight and 1% by weight.

The hollow fibers are hauled off at between 2 and 100 m/min, preferably between 10 and 50 m/min and more preferably between 20 and 40 m/min. The fibers are wound up onto a bobbin and washed in water until the residual solvent content is below 1%. This is followed by treatment in ethanol and hexane. The fibers are then dried—preferably between room temperature and 150° C. and more preferably between 50 and 100° C. Fibers are obtained with external diameters of 100 to 1000 μm, preferably between 200 and 700 μm and more preferably between 250 and 400μ.

The process of the present invention thus provides hollow fiber membranes of polyimides that exhibit high separation performances for various gases. An excerpt for various polymers and gases is summarized in Table 2.

TABLE 2

Permeances of various inventive polyimide hollow fibers in single gas measurements

| Polyimide polymer of hollow fiber | Internal diameter [μm] | External diameter [μm] | Gas | Transmembrane pressure [bar] | Permeance [GPU] | Selectivity |
|---|---|---|---|---|---|---|
| P84 type 70 | 250 | 412 | O2 | 5 | 1.45 | 8.8 |

TABLE 2-continued

Permeances of various inventive polyimide hollow fibers in single gas measurements

| Polyimide polymer of hollow fiber | Internal diameter [μm] | External diameter [μm] | Gas | Trans-membrane pressure [bar] | Permeance [GPU] | Selectivity |
|---|---|---|---|---|---|---|
|  | 250 | 412 | N2 | 5 | 0.165 |  |
|  | 250 | 412 | CO2 | 5 | 6.0 | 72 |
|  | 250 | 412 | CH4 | 5 | 0.084 |  |
|  | 250 | 412 | CO2 | 40 | 9.0 | 88 |
|  | 250 | 412 | CH4 | 40 | 0.101 |  |
| P84 T100 | 339 | 189 | O2 | 10 | 0.56 | 7.8 |
|  | 339 | 189 | N2 | 10 | 0.072 |  |
|  | 339 | 189 | CO2 | 10 | 1.68 | 72 |
|  | 339 | 189 | CH4 | 10 | 0.023 |  |
| P84 HT | 174 | 300 | O2 | 9 | 0.65 | 8.4 |
|  | 174 | 300 | N2 | 10 | 0.078 |  |
|  | 245 | 397 | CO2 | 10 | 2.60 | 58 |
|  | 245 | 397 | CH4 | 9 | 0.044 |  |

It is further notable that the membranes even under high $CO_2$ partial pressures scarcely exhibit any increase in methane permeance, retain their selectivity and therefore are scarcely plasticized. This property is necessary to process sour gases with high $CO_2$ contents and high pressures, as is the case for example with the workup of crude natural gas or crude biogas.

The hollow fiber membranes can also be crosslinked with amines. When the hollow fiber is crosslinked, this is done subsequent to the washing step. For this purpose, the hollow fiber is passed through a bath containing an amine with 2 or more amino groups per molecule such as, for example, a diamine, triamine, tetraamine or a polyamine. The amine may be primary or secondary or consist of mixtures of primary, secondary and tertiary amines in one molecule. Useful amines include aliphatic amines, aromatic amines and mixed aliphatic-aromatic amines. Silicone-based amines are also possible. Examples of aliphatic diamines include inter alia but not exclusively: diaminoethane, diaminopropane, diaminobutane, diaminopentane, diaminohexane, diaminoheptane, diaminooctane, diaminodecane or diamino compounds of branched or cyclic aliphatics (e.g. cis- and trans-1,4-cyclohexane) and of longer-chain compounds.

Useful aromatic compounds include inter alia but not exclusively: p-phenylenediamines, m-phenylenediamines, 2,4-tolylenediamines, 2,6-tolylenediamines, 4,4'-diaminodiphenyl ether.

Examples of mixed aliphatic-aromatic amines include inter alia but not exclusively: aminoalkyl-substituted aromatics such as, for example, p-bis(aminomethyl)-benzene.

Useful siliconic-based amines include inter alia but not exclusively: bis(aminoalkyl)siloxanes of differing chain length.

Useful representatives of polyfunctional amines include inter alia but not exclusively the following compounds: oligo- or polyethyleneimines having various molar masses (400 to 200 000 g/mol), N,N',N''-trimethylbis-(hexamethylene)triamine, bis(6-aminohexyl)amine Crosslinking is effected by emplacement into or continuous pulling of the entire hollow fiber through a solution of the particular diamine in water or a mixture of water and water-miscible solvents or other solvents which do not influence the membrane structure and which dissolves the particular amines. Possibilities for this are for example but not exclusively:

Alcohols such as, for example, methanol, ethanol, isopropanol, propanol, butanol, butanediol, glycerol Ethers such as, for example, diethyl ether, tetrahydrofuran, dioxane or polyethylene glycols or polyethylene glycol ethers Aprotic dipolar solvents such as, for example, dimethylformamide, dimethylacetamide, N-methylpyrrolidone, N-ethylpyrrolidone, tetramethylurea, dimethyl sulfoxide or sulfolane Ketones such as, for example, acetone or methyl ethyl ketone Others such as ethyl acetate, dichloromethane, chloroform, toluene, xylene, aliphatics and cycloaliphatics such as hexane, heptane or cyclohexane.

The concentration of diamines is between 0.01% by weight and 10% by weight, but preferably between 0.05% by weight and 5% by weight and more preferably between 0.1% by weight and 1% by weight.

The crosslinking solution temperature is between 1 and 100° C., preferably between 10 and 70° C. and more preferably between 20 and 50° C.

Residence time is between 10 seconds and 10 hours, preferably between 1 minutes and 60 minutes and more preferably between 2 and 10 min.

To remove the residual amine, the membrane is washed with water. Wash bath temperature is between 10 and 90° C. and preferably between 20 and 60° C. Wash bath residence time is from 1 to 200 minutes, preferably between 2 and 50 minutes and more preferably between 3 and 10 minutes.

Hollow fibers are obtained that are no longer soluble in traditional organic solvents such as for example but not exclusively dimethylformamide, dimethylacetamide, N-methylpyrrolidone, N-ethylpyrrolidone, tetramethylurea, dimethyl sulfoxide or sulfolane, acetone, methyl ethyl ketone, diethyl ether, tetrahydrofuran, dioxane, ethyl acetate, dichloromethane, chloroform, toluene, xylene, hexane, heptane or cyclohexane. They can therefore be used in nano-, ultra- and microfiltration in organic solvents.

Producing the Flat Sheet Membranes

The additized and devolatilized solution is poured without bubbles into the applicator of a flat sheet membrane casting rig. Applicator width can be up to 1.2 m. A calendered backing fleece of polymer fibers, preferably but not exclusively in polyimide, polypropylene, polyamide, polyester or polyphenylene sulfide, passes underneath the applicator at a speed of 0.1 to 10 m/min and preferably 1 to 5 m/min. Fleece thickness is between 30 and 300μ and preferably between 100 and 200μ. Basis weight is between 20 and 300 g/m² and preferably between 50 and 150 g/m². Gap width between applicator and fleece is between 100 and 800μ and preferably between 200 and 400μ. The coated fleece enters a channel flooded with a countercurrent stream of gas. Useful gases include inter alia but not exclusively dry air, nitrogen, argon or helium. The gas flowing over the coated fleece moves at a speed in the range from 100 to 5000 m/h and preferably between 200 and 1000 m/h, gas temperatures can be between 10 and 150° C. and preferably between 15 and 90° C. The coated fleece then enters a coagulation bath, the polymer coagulates and forms the desired membrane. The coagulation bath consists of water or mixtures of water and one or more solvents that are miscible with water.

Possibilities for this include:

Alcohols such as, for example, methanol, ethanol, isopropanol, propanol, butanol, butanediol, glycerol Ethers such as, for example, diethyl ether, tetrahydrofuran, dioxane or polyethylene glycols or polyethylene glycol ethers Aprotic dipolar solvents such as, for example, dimethylformamide, dimethylacetamide, N-methylpyrrolidone, N-ethylpyrrolidone, tetramethylurea, dimethyl sulfoxide or sulfolane Ketones such as, for example, acetone or methyl ethyl ketone.

Coagulation bath temperature is between 1 and 90° C. and preferably between 10 and 50° C. Following a short residence time of 10 s to 10 min and preferably 1 to 5 min the membrane is wound up in the wet state.

To remove residual solvent, the membrane is washed with water. Wash bath temperature is between 10 and 90° C. and preferably between 20 and 60° C. Wash bath residence time is from 1 to 200 minutes, preferably between 2 and minutes and more preferably between 3 and 10 minutes.

When the membrane is crosslinked, this is done subsequent to the washing step. For this purpose, the membrane is passed through a bath containing an amine with 2 or more amino groups per molecule such as, for example, a diamine, triamine, tetraamine or polyamine. The amine may be primary or secondary or consist of mixtures of primary, secondary and tertiary amines in one molecule. Useful amines include aliphatic amines, aromatic amines and mixed aliphatic-aromatic amines. Silicone-based amines are also possible.

Examples of aliphatic diamines include inter alia but not exclusively: diaminoethane, diaminopropane, diaminobutane, diaminopentane, diaminohexane, diaminoheptane, diaminooctane, diaminodecane or diamino compounds of branched or cyclic aliphatics (e.g. cis- and trans-1,4-cyclohexane) and of longer-chain compounds.

Useful aromatic compounds include inter alia but not exclusively: p-phenylenediamines, m-phenylenediamines, 2,4-tolylenediamines, 2,6-tolylenediamines, 4,4'-diaminodiphenyl ether.

Examples of mixed aliphatic-aromatic amines include inter alia but not exclusively: aminoalkyl-substituted aromatics such as, for example, p-bis(aminomethyl)-benzene.

Useful siliconic-based amines include inter alia but not exclusively: bis(aminoalkyl)siloxanes of differing chain length. Useful representatives of polyfunctional amines include inter alia but not exclusively the following compounds: oligo- or polyethyleneimines having various molar masses (400 to 200 000 g/mol), N,N',N'''-trimethylbis(hexamethylene)triamine, bis(6-aminohexyl)amine Crosslinking is effected by emplacing the entire membrane into a solution of the particular diamine in water or a mixture of water and water-miscible solvents or other solvents which do not influence the membrane structure and which dissolves the particular amines.

Possibilities for this are for example but not exclusively:

Alcohols such as, for example, methanol, ethanol, isopropanol, propanol, butanol, butanediol, glycerol Ethers such as, for example, diethyl ether, tetrahydrofuran, dioxane or polyethylene glycols or polyethylene glycol ethers Aprotic dipolar solvents such as, for example, dimethylformamide, dimethylacetamide, N-methylpyrrolidone, N-ethylpyrrolidone, tetramethylurea, dimethyl sulfoxide or sulfolane Ketones such as, for example, acetone or methyl ethyl ketone Others such as ethyl acetate, dichloromethane, chloroform, toluene, xylene, aliphatics and cycloaliphatics such as hexane, heptane or cyclohexane.

The concentration of diamines, the crosslinking solution temperature, the residence time and the way the washing step is carried out correspond to the values and procedures, respectively, indicated above for crosslinking the hollow fibers.

Following the washing/crosslinking operations, the membrane is impregnated to ensure pore preservation during subsequent drying. This is done by dipping the membrane into a mixture of water and a water-miscible high boiler.

Possibilities for this are for example but not exclusively: glycerol, polyethylene glycols of differing chain length in admixture or singly, polyethylene glycol dialkyl ethers of different chain lengths in admixture or singly as methyl or ethyl ethers, mono- or diols having a boiling point above 200° C. such as, for example, decanol, 1,4-butanediol, 1,6-hexanediol.

The concentration of high boiler in water is between 5% and 95%, but preferably between 25% by weight and 75% by weight. Impregnating solution temperature is between 1 and 100° C., preferably between 10 and 70° C. and more preferably between 20 and 50° C.

The residence time is between 10 seconds and 10 hours, preferably between 1 minutes and 60 minutes and more preferably between 2 and 10 min.

After impregnation, the membrane is dried. Drying can be done in the ambient air or continuously in a convective dryer. Drying temperature is in the range from 20 to 200° C. and preferably between 50 and 120° C. Drying time is between 10 seconds and 10 hours, preferably between 1 minutes and 60 minutes and more preferably between 2 and 10 min. After drying, the final membrane is wound up and can be further processed into spiral-wound elements or pocket modules.

The flat and hollow fiber membranes of the present invention thus comprise a polyimide having an Mp>100 000 g·mol$^{-1}$, preferably 110 000 to 200 000 g·mol$^{-1}$ and more preferably 120 000 to 170 000 g·mol$^{-1}$ and a PDI in the range from 1.7 to 2.3 and preferably in the range from 1.8 to 2.1. Mp here corresponds to the peak maximum of the molar mass distribution on calibration against polystyrene standards in 0.01 mol/l of lithium bromide in dimethylformamide.

The high molar mass effectuates an improvement in mechanical properties regarding membrane strength and toughness. This is more particularly required at high pressures in the applications. Flat sheet membranes have to withstand at least 40 bar in operation and certain hollow fiber membranes above 100 bar in natural gas enrichment.

A high molar mass is also advantageous to achieve a sufficiently high viscosity even at moderate solids contents. Casting solutions require a certain viscosity for stable processing into membranes and hollow fibers and in order that dense and selective layers on the surface may be produced therewith.

PRODUCTION EXAMPLES

The examples which follow serve to provide more particular elucidation and better understanding of the present invention, but do not limit it in any way.

Producing the Polyimide Solutions

Example 1: Producing a P84 Type 70 Polyimide Solution in Dimethylacetamide

A 3 l glass reactor equipped with stirrer and reflux condenser is initially charged with 1622 g of anhydrous dimethylacetamide. A quantity of 456.4 g of 3,3',4,4'-benzophenonetetracarboxylic dianhydride are dissolved therein and the solution is heated to 90° C. To this solution is added 0.45 g of sodium hydroxide. Under nitrogen, 266.8 g of a mixture of 64% of 2,4-tolylene diisocyanate, 16% of 2,6-tolylene diisocyanate and 20% of 4,4'-diisocyanatodiphenylmethane are metered during several hours. In the process, $CO_2$ escapes as by-product and a polyimide results directly in solution.

The highly viscous solution obtained has a golden color, a solids content of 25% and a viscosity of 49 Pa·s.

The molar masses are determined by gel permeation chromatography as follows: Mn=80 600 g·mol$^{-1}$, Mp=139 600 g·mol$^{-1}$, Mw=170 000 g·mol$^{-1}$ PDI=2.11

Example 2: Producing a P84 Type 70 Polyimide Solution in Dimethylformamide

A 3 l glass reactor equipped with stirrer and reflux condenser is initially charged with 1622 g of anhydrous dimethylformamide. A quantity of 456.4 g of 3,3',4,4'-benzophenonetetracarboxylic dianhydride are dissolved therein and the solution is heated to 90° C. To this solution is added 0.45 g of sodium hydroxide. Under nitrogen, 266.8 g of a mixture of 64% of 2,4-tolylene diisocyanate, 16% of 2,6-tolylene diisocyanate and 20% of 4,4'-diisocyanatodiphenylmethane are metered during several hours. In the process, $CO_2$ escapes as by-product and a polyimide results directly in solution.

The highly viscous solution obtained has a golden color, a solids content of 27% and a viscosity of 48 Pa·s.

The molar masses are determined by gel permeation chromatography as follows: Mn=76 600 g·mol$^{-1}$, Mp=130 500 g·mol$^{-1}$, Mw=146 200 g·mol$^{-1}$ PDI=1.91

Example 3: Producing a P84 Type 70 Polyimide Solution in N-methylpyrrolidone A 3 l glass reactor equipped with stirrer and reflux condenser is initially charged with 1800 g of anhydrous N-methylpyrrolidone. A quantity of 456.4 g of 3,3',4,4'-benzophenonetetracarboxylic dianhydride are dissolved therein and the solution is heated to 90° C. To this solution is added 0.45 g of sodium hydroxide. Under nitrogen, 266.8 g of a mixture of 64% of 2,4-tolylene diisocyanate, 16% of 2,6-tolylene diisocyanate and 20% of 4,4'-diisocyanatodiphenylmethane are metered during several hours. In the process, $CO_2$ escapes as by-product and a polyimide results directly in solution.

The highly viscous solution obtained has a golden color, a solids content of 25% and a viscosity of 45 Pa·s.

The molar masses are determined by gel permeation chromatography as follows: Mn=65 700 g·mol$^{-1}$, Mp=107 200 g·mol$^{-1}$, Mw=147 000 g·mol$^{-1}$ PDI=2.24

Example 4: Producing a P84 Type 70 Polyimide Solution in N-ethylpyrrolidone

A 3 l glass reactor equipped with stirrer and reflux condenser is initially charged with 1622 g of anhydrous N-ethylpyrrolidone. A quantity of 456.4 g of 3,3',4,4'-benzophenonetetracarboxylic dianhydride are dissolved therein and the solution is heated to 90° C. To this solution is added 0.45 g of sodium hydroxide. Under nitrogen, 266.8 g of a mixture of 64% of 2,4-tolylene diisocyanate, 16% of 2,6-tolylene diisocyanate and 20% of 4,4'-diisocyanatodiphenylmethane are metered during several hours. In the process, $CO_2$ escapes as by-product and a polyimide results directly in solution.

The highly viscous solution obtained has a golden color, a solids content of 27% and a viscosity of 87 Pa·s.

The molar masses are determined by gel permeation chromatography as follows: Mn=64 600 g·mol$^{-1}$, Mp=105 200 g·mol$^{-1}$, Mw=144 700 g·mol$^{-1}$ PDI=2.24

Example 5: Producing a P84 T100 Polyimide Solution in Dimethylformamide

A 3 l glass reactor equipped with stirrer and reflux condenser is initially charged with 1800 g of anhydrous dimethylformamide. A quantity of 473.6 g of 3,3',4,4'-benzophenonetetracarboxylic dianhydride are dissolved therein and the solution is heated to 90° C. To this solution is added 1.8 g of diazabicyclooctane. Under nitrogen, 254.4 g of a mixture of 2,4-tolylene diisocyanate are metered during several hours. In the process, $CO_2$ escapes as by-product and a polyimide results directly in solution.

The highly viscous solution obtained has a golden color, a solids content of 25% and a viscosity of 59 Pa·s.

The molar masses are determined by gel permeation chromatography as follows: Mn=82 100 g·mol$^{-1}$, Mp=151 500 g·mol$^{-1}$, Mw=181 900 g·mol$^{-1}$ PDI=2.21

Example 6: Producing a P84 T80 Polyimide Solution in Dimethylformamide

A 3 l glass reactor equipped with stirrer and reflux condenser is initially charged with 1622 g of anhydrous dimethylformamide. A quantity of 473.6 g of 3,3',4,4'-benzophenonetetracarboxylic dianhydride are dissolved therein and the solution is heated to 90° C. To this solution is added 1.8 g of diazabicyclooctane. Under nitrogen, 254.4 g of a mixture of 80% of 2,4-tolylene diisocyanate and 20% of 2,6-tolylene diisocyanate are metered during several hours. In the process, $CO_2$ escapes as by-product and a polyimide results directly in solution.

The highly viscous solution obtained has a golden color, a solids content of 27% and a viscosity of 108 Pa·s.

The molar masses are determined by gel permeation chromatography as follows: Mn=83 800 g·mol$^{-1}$, Mp=152 300 g·mol$^{-1}$, Mw=173 800 g·mol$^{-1}$ PDI=2.07

Example 7: Producing a P84 HT Polyimide Solution in Dimethylformamide

A 3 l glass reactor equipped with stirrer and reflux condenser is initially charged with 1800 g of anhydrous dimethylformamide. A quantity of 316.4 g of 3,3',4,4'-benzophenonetetracarboxylic dianhydride and 142.8 g of pyromellitic dianhyhdride are dissolved therein and the solution is heated to 90° C. To this solution is added 1.8 g of diazabicyclooctane. Under nitrogen, 283.4 g of a mixture of 80% of 2,4-tolylene diisocyanate and 20% of 2,6-tolylene diisocyanate are metered during several hours. In the process, $CO_2$ escapes as by-product and a polyimide results directly in solution.

The highly viscous solution obtained has a golden color, a solids content of 27% and a viscosity of 70 Pa·s.

The molar masses are determined by gel permeation chromatography as follows: Mn=75 500 g·mol$^{-1}$, Mp=122 200 g·mol$^{-1}$, Mw=150 900 g·mol$^{-1}$ PDI=2.00

Example 8: Producing a P84 MDI Polyimide Solution in Dimethylformamide

A 3 l glass reactor equipped with stirrer and reflux condenser is initially charged with 1500 g of anhydrous dimethylformamide. A quantity of 369.2 g of 3,3',4,4'-benzophenonetetracarboxylic dianhydride are dissolved therein and the solution is heated to 90° C. To this solution is added 1.5 g of diazabicyclooctane. Under nitrogen, 222.3 g of 2,4,6-trimethyl-1,3-phenylene diisocyanate are metered during several hours. In the process, $CO_2$ escapes as by-product and a polyimide results directly in solution.

The highly viscous solution obtained has a pale yellow color, a solids content of 25% and a viscosity of 5 Pa·s.

The molar masses are determined by gel permeation chromatography as follows: Mn=55 200 g·mol$^{-1}$, Mp=95 000 g·mol$^{-1}$, Mw=112 000 g·mol$^{-1}$ PDI=2.03

Film Production and Intrinsic Gas Permeabilities

The polymerization solutions are filtered neat through a 15μ metal sieve. The films are produced using an instrument from Elcometer (Elcometer 4340) with an applicator. Glass plates are coated with the polymer solutions using an applicator and a gap size of 250 The solvent is subsequently evaporated off in a circulating air drying cabinet at 70° C. (0.5 h), 150° C. (2 h) and 250° C. (12 h). The films are then virtually free of solvents (content <0.1%) and are detached from the glass plates. The films obtained have a thickness of about 30 to 40 μm. None of the films was brittle and all exhibited good mechanical properties. These films were then examined under the microscope to find imperfection-free places and circularly round samples having a diameter of 46 mm are cut out. These samples are then emplaced into the self-built gas permeation apparatus and the permeability of various gases is determined by the vacuum method.

This involves pressurizing the films with a single gas (e.g. nitrogen, oxygen, methane or carbon dioxide) at various pressures and recording the increase in pressure on the permeate side. This is used to calculate the permeability in barriers (10-6 cm$^3$·cm$^{-2}$·s$^{-1}$·cmHg$^{-1}$). Some examples are adduced in what follows.

Example 9: Gas Permeabilities of Various Polymers from Examples Above

| Polymer | Thickness (μm) | Gas | Transmembrane pressure (bar) | Permeability (barrer) | Selectivity |
|---|---|---|---|---|---|
| Example 2 | | O2 | | 0.182 | 10.0 |
| (P84 | | N2 | | 0.018 | |
| type 70) | | CO2 | | 0.571 | 67.2 |
| | | CH4 | | 0.008 | |
| Example 5 | 37.9 | O2 | 10.9 | 0.250 | 30.9 |
| (P84 | 37.9 | N2 | 11.0 | 0.008 | |
| T100) | 37.9 | CO2 | 25.2 | 0.622 | 124 |
| | 37.9 | CH4 | 17.5 | 0.005 | |
| Example 6 | 36.0 | O2 | 10.7 | 0.280 | 21.2 |
| (P84 T80) | 36.0 | N2 | 11.1 | 0.013 | |
| | 36.0 | CO2 | 28.4 | 0.696 | 237 |
| | 36.0 | CH4 | 31.5 | 0.003 | |
| Example 7 | 41.2 | O2 | 12.0 | 0.53 | 13.2 |
| (P84 HT) | 41.2 | N2 | 12.3 | 0.04 | |
| | 41.6 | CO2 | 36.8 | 1.69 | 169 |
| | 41.6 | CH4 | 36.4 | 0.01 | |

Additizing the Polymerization Solution

Example 10: Producing a Casting Solution from P84 Type 70 for Production of Polyimide Hollow Fibers In a 3 l stirred tank of glass with powerful stirrer, 1168 g of P84 type 70 solution in dimethylformamide from Example 2 are admixed with a mixture of 94.1 g of tetrahydrofuran and 40.3 g of isopropanol added dropwise at room temperature. In the course of addition, the polymer briefly precipitates at the drop entry point, but quickly redissolves again. Stirring is continued until a homogeneous solution is produced. This homogeneous solution is then filtered through a sieve having a mesh size of 15μ and left to stand for 2 days without stirring. The casting solution obtained has a solids content of 23.5%, a dimethylformamide content of 66.5%, a tetrahydrofuran content of 7% and an isopropanol content of 3%.

Example 11: Producing a Casting Solution from P84 Type 70 for Production of Polyimide Hollow Fibers In a 3 l stirred tank of glass with powerful stirrer, 1034 g of P84 type 70 solution in dimethylformamide from Example 2 are admixed with a mixture of 58.6 g of tetrahydrofuran and 46.9 g of isopropanol added dropwise at room temperature. In the course of addition, the polymer briefly precipitates at the drop entry point, but quickly redissolves again. Stirring is continued until a homogeneous solution is produced. This homogeneous solution is then filtered through a sieve having a mesh size of 15μ and left to stand for 2 days without stirring. The casting solution obtained has a solids content of 23.8%, a dimethylformamide content of 67.2%, a tetrahydrofuran content of 5% and an isopropanol content of 4%.

Example 12: Producing a Casting Solution from P84 Type HT for Production of Polyimide Hollow Fibers In a 3 l stirred tank of glass with powerful stirrer, 1034 g of P84 type HT solution in dimethylformamide from Example 7 are admixed with a mixture of 47 g of tetrahydrofuran and 65 g of isopropanol added dropwise at room temperature. In the course of addition, the polymer briefly precipitates at the drop entry point, but quickly redissolves again. Stirring is continued until a homogeneous solution is produced. This homogeneous solution is then filtered through a sieve having a mesh size of 15μ and left to stand for 2 days without stirring. The casting solution obtained has a solids content of 23.6%, a dimethylformamide content of 66.9%, a tetrahydrofuran content of 4% and an isopropanol content of 5.5%.

Example 13: Producing a Casting Solution from P84 T100 for Production of Polyimide Hollow Fibers In a 3 l stirred tank of glass with powerful stirrer, 1034 g of P84 T100 solution in dimethylformamide from Example 5 are admixed with a mixture of 46.8 g of tetrahydrofuran and 58.5 g of isopropanol added dropwise at room temperature. In the course of addition, the polymer briefly precipitates at the drop entry point, but quickly redissolves again. Stirring is continued until a homogeneous solution is produced. This homogeneous solution is then filtered through a sieve having a mesh size of 15μ and left to stand for 2 days without stirring. The casting solution obtained has a solids content of 22.1%, a dimethylformamide content of 68.9%, a tetrahydrofuran content of 5% and an isopropanol content of 4%.

Example 14: Producing a Casting Solution from P84 Type for Production of Flat Sheet Membranes for Organophilic Nanofiltration In a 3 l stirred tank of glass with powerful stirrer, 1034 g of P84 type 70 solution in dimethylformamide from Example 2 are admixed with 258.5 g of tetrahydrofuran added dropwise at room temperature. Stirring is continued until a homogeneous solution is produced. This homogeneous solution is then filtered through a sieve having a mesh size of 15µ and left to stand for 2 days without stirring. The casting solution obtained has a solids content of 21.6%, a dimethylformamide content of 58.4% and a tetrahydrofuran content of 20%.

Hollow Fiber Production

Example 15: Hollow Fiber Production from a Casting Solution with P84 Type 70 in Dimethylformamide from Example 10

The devolatized, filtered and additized solution of P84 type 70 in dimethylformamide from Example 10 is thermostated to 50° C. and gear pumped through a two-material die. Flux is 162 g/h. While the polymer solution is conveyed in the outer region of the two-material die, a mixture of 70% of dimethylformamide and 30% of water is conveyed in the inner region in order to produce the hole in the hollow fiber. Flux is 58 ml/h. After a distance of 40 cm, the hollow fiber enters cold water at 10° C. The hollow fiber is enveloped here with a tube. This tube is flooded with a 2 l/min stream of nitrogen, tube internal temperature being 41° C. The fiber is then pulled through a water wash bath and finally wound up at a speed of 15 m/min. After extraction with water for several hours, the hollow fibers are dipped first in ethanol and then in heptane and subsequently air dried to obtain hollow fibers having an outer diameter of 412µ, a hole diameter of 250µ and a wall thickness of 81µ.

Single gas measurements gave the following permeances for the hollow fibers at a transmembrane pressure of 5 bar:
oxygen: 1.450 GPU
nitrogen: 0.165 GPU
carbon dioxide: 6.03 GPU
methane: 0.084 GPU Single gas selectivities are thus 8.8 as between oxygen and nitrogen and 71.9 as between carbon dioxide and methane Single gas measurements gave the following permeances for the hollow fibers at a transmembrane pressure of 40 bar:
carbon dioxide: 8.99 GPU
methane: 0.101 GPU Single gas selectivities are 88.5 as between carbon dioxide and methane

Example 16: Hollow Fiber Production from a Casting Solution with P84 Type 70 in Dimethylformamide from Example 11

The devolatized, filtered and additized solution of P84 type 70 in dimethylformamide from Example 11 is thermostated to 50° C. and gear pumped through a two-material die. Flux is 162 g/h. While the polymer solution is conveyed in the outer region of the two-material die, a mixture of 70% of dimethylformamide and 30% of water is conveyed in the inner region in order to produce the hole in the hollow fiber. Flux is 58 ml/h. After a distance of 42 cm, the hollow fiber enters cold water at 10° C. The hollow fiber is enveloped here with a tube. This tube is flooded with a 2 l/min stream of nitrogen, tube internal temperature being 46° C. The fiber is then pulled through a water wash bath and finally wound up at a speed of 24 m/min. After extraction with water for several hours, the hollow fibers are dipped first in ethanol and then in heptane and subsequently air dried to obtain hollow fibers having an outer diameter of 310µ, a hole diameter of 188µ and a wall thickness of 61µ.

Single gas measurements gave the following permeances for the hollow fibers at a transmembrane pressure of 9 bar:
oxygen: 1.463 GPU
nitrogen: 0.164 GPU Single gas selectivities are thus 8.9 as between oxygen and nitrogen

Example 17: Hollow Fiber Production from a Casting Solution with P84 T100 in Dimethylformamide from Example 13

The devolatized, filtered and additized solution of P84 T100 in dimethylformamide from Example 13 is thermostated to 50° C. and gear pumped through a two-material die. Flux is 162 g/h. While the polymer solution is conveyed in the outer region of the two-material die, a mixture of 70% of dimethylformamide and 30% of water is conveyed in the inner region in order to produce the hole in the hollow fiber. Flux is 58 ml/h. After a distance of 42 cm, the hollow fiber enters cold water at 10° C. The hollow fiber is enveloped here with a tube. This tube is flooded with a 2 l/min stream of nitrogen, tube internal temperature being 46° C. The fiber is then pulled through a water wash bath and finally wound up at a speed of 20 m/min. After extraction with water for several hours, the hollow fibers are dipped first in ethanol and then in heptane and subsequently air dried to obtain hollow fibers having an outer diameter of 339µ, a hole diameter of 189µ and a wall thickness of 75µ.

Single gas measurements gave the following permeances for the hollow fibers at a transmembrane pressure of 9 bar:
oxygen: 0.564 GPU
nitrogen: 0.072 GPU
carbon dioxide: 1.679
methane: 0.023

Single gas selectivities are thus 7.8 as between oxygen and nitrogen and 71.6 as between carbon dioxide and methane

Example 18: Hollow Fiber Production from a Casting Solution with P84 HT in Dimethylformamide The devolatized, filtered and additized solution of P84 HT in dimethylformamide from Example 12 is thermostated to 50° C. and gear pumped through a two-material die. Flux is 162 g/h. While the polymer solution is conveyed in the outer region of the two-material die, a mixture of 70% of dimethylformamide and 30% of water is conveyed in the inner region in order to produce the hole in the hollow fiber. Flux is 58 ml/h. After a distance of 15 cm, the hollow fiber enters cold water at 10° C. The hollow fiber is enveloped here with a tube. This tube is flooded with a 1 l/min stream of nitrogen, tube internal temperature being 40° C. The fiber is then pulled through a water wash bath and finally wound up at a speed of 24 m/min. After extraction with water for several hours, the hollow fibers are dipped first in ethanol and then in heptane and subsequently air dried to obtain hollow fibers having an outer diameter of 306µ, a hole diameter of 180µ and a wall thickness of 63µ.

Single gas measurements gave the following permeances for the hollow fibers at a transmembrane pressure of 10 bar:
carbon dioxide: 6.0 GPU
methane: 0.2 GPU
Single gas selectivities are thus 30 as between carbon dioxide and methane

Example 19: Hollow Fiber Production from a Polymerization Solution with P84 HT in Dimethylformamide from Example 7

The devolatized filtered solution of P84 HT in dimethylformamide from Example 7 is thermostated to 50° C. and gear pumped through a two-material die. Flux is 162 g/h. While the polymer solution is conveyed in the outer region of the two-material die, a mixture of 70% of dimethylformamide and 30% of water is conveyed in the inner region in order to produce the hole in the hollow fiber. Flux is 58 ml/h. After a distance of 15 cm, the hollow fiber enters cold water at 10° C. The hollow fiber is enveloped here with a tube. This tube is flooded with a 1 l/min stream of nitrogen, tube internal temperature being 70° C. The fiber is then pulled through a water wash bath and finally wound up at a speed of 24 m/min. After extraction with water for several hours, the hollow fibers are dipped first in ethanol and then in heptane and subsequently air dried to obtain hollow fibers having an outer diameter of 307μ, a hole diameter of 189μ and a wall thickness of 59μ.

Single gas measurements gave the following permeances for the hollow fibers at a transmembrane pressure of 10 bar:
carbon dioxide: 3.37 GPU
methane: 0.051 GPU
Single gas selectivities are thus 66 as between carbon dioxide and methane The fiber was additionally measured at higher pressures in order to measure plasticization characteristics and pressure stability.

| Pressure [bar] | CO2 permeance [GPU] | Methane permeance [GPU] | Selectivity |
| --- | --- | --- | --- |
| 10 | 3.365 | 0.051 | 66 |
| 20 | 3.199 | 0.045 | 72 |
| 30 | 3.535 | 0.034 | 103 |
| 40 | 4.025 | 0.042 | 96 |
| 50 | 4.376 | 0.033 | 131 |
| 60 | 4.300 | 0.026 | 165 |
| 70 | — | 0.027 | — |
| 90 | — | 0.014 | — |

Flat Sheet Membrane Production

Example 20: Producing a Flat Sheet Membrane from P84 Type 70

A flat sheet membrane rig is used to produce 35 cm wide membranes from a casting solution described in Example 14. For this, the casting solution is coated using an application and a casting gap of 200μ onto a calendered polyester fleece having a basis weight of 100 g/m$^2$ and a speed of 5 m/min. The coated polyester fleece is then passed through a shaft through which nitrogen is flowed. The speed of flow is 339 m/h. The residence time thus achieved is 3 s. The coated fleece then dips into cold water at 10° C. The crude membrane is then wound up wet.

Subsequently, the membrane is at 70° C. extracted in water and impregnated with a conditioning agent (25% of polyethylene glycol dimethyl ether (PGDME 250 from Clariant) in water). It is dried in a festoon dryer at a temperature of 60° C.

The membrane is characterized in a Milipore stirred cell at a pressure of 5 bar. The solvent used is heptane in which hexaphenylbenzene is dissolved in a concentration of 12 mg/l. Measurement revealed a flux of 1.7 l·m$^{-2}$·h$^{-1}$·bar$^{-1}$ coupled with a retention of 94%

Figure 1:
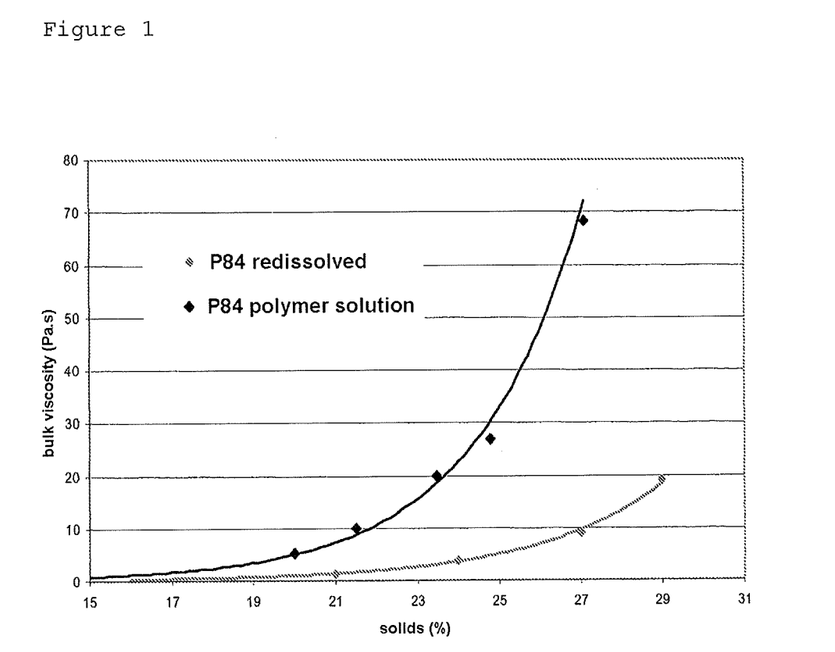
FIG. 1: Influence of concentrations of P84 type 70 in DMF on viscosity of solution: comparing a P84 polymerization solution and a P84 solution prepared from a precipitated and redissolved polymer at 25° C.
Figure 2:
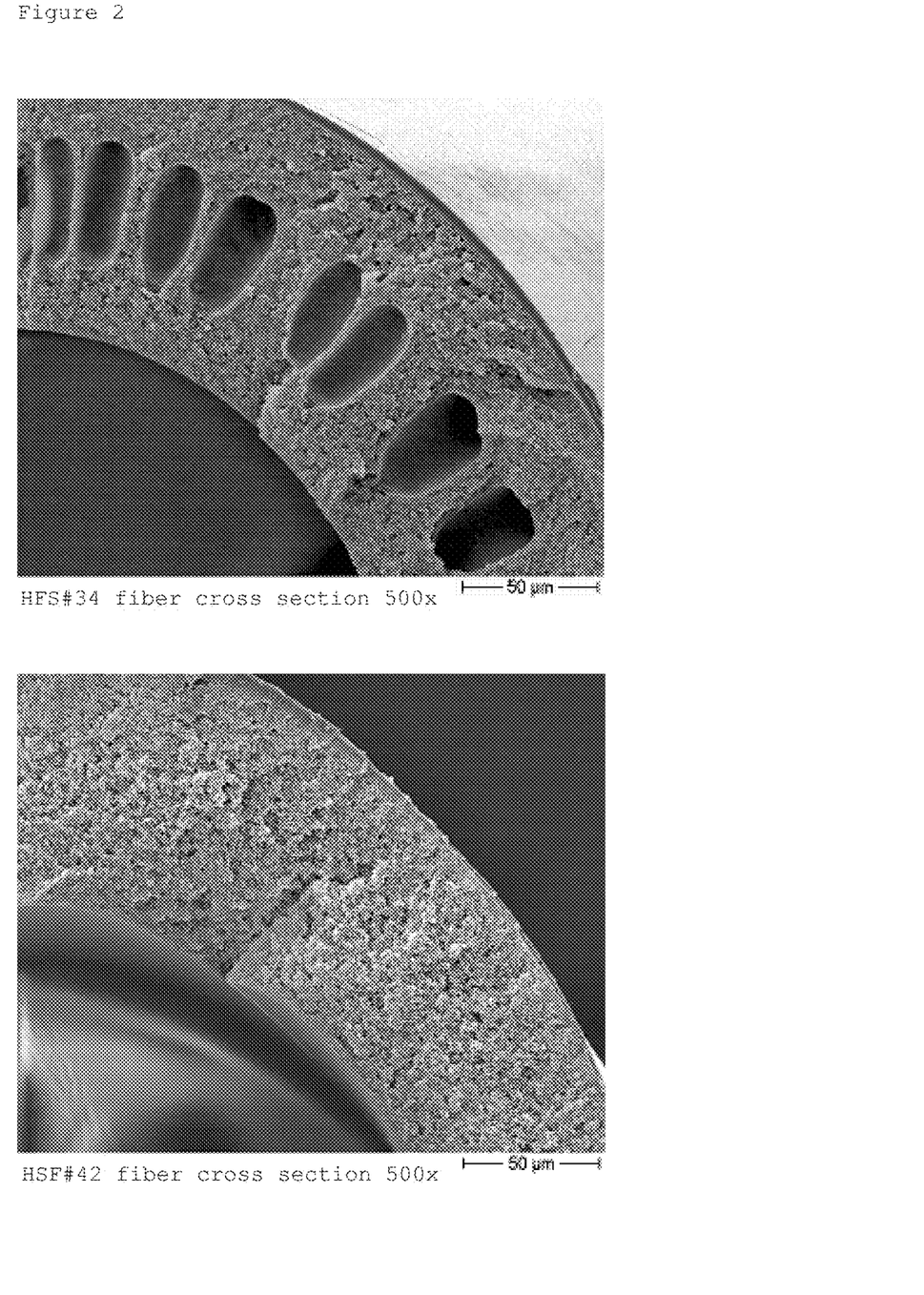
FIG. 2: Cross sections of hollow fiber membranes with macrovoids (picture at left) and without macrovoids (picture at right)
Figure 3:
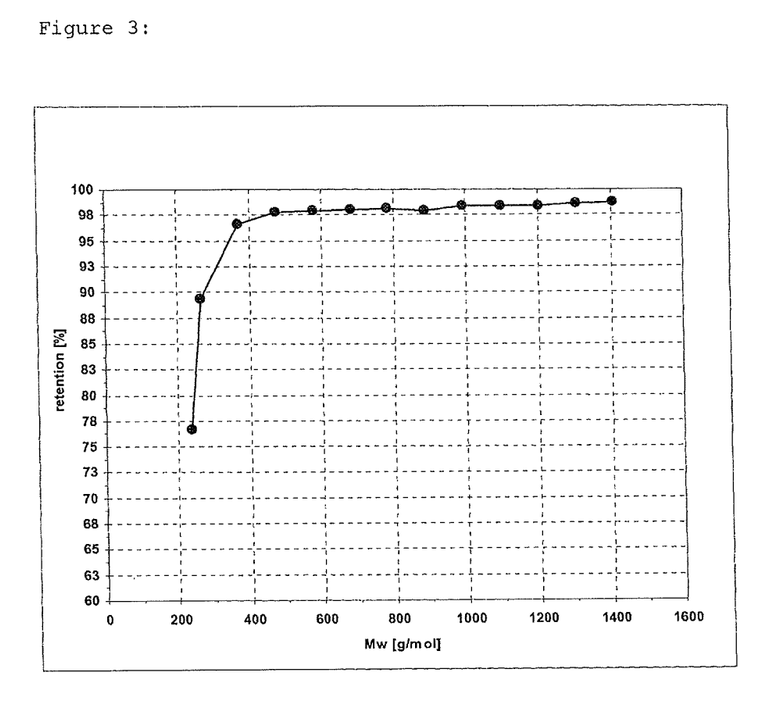
FIG. 3:
Application test of membrane from Example 20.

The membrane is subsequently also tested at a pressure of 30 bar and 30° C. in toluene. Oligostyrenes are used as test molecules. Flux in this test with toluene was 90 l·m$^{-2}$·h$^{-1}$. The membrane exhibits very high retention over the entire molar mass range and has a sharp cut-off in the region between 200 and 300 daltons (see FIG. 3).

Crosslinking the Membranes with Diamines

Example 21: Crosslinking a Flat Sheet Membrane with Amines

The flat sheet membrane from Example 20 was placed for 16 h into a 0.1% ethanolic solution of an oligoethyleneimine ((#468533, Aldrich, typical molecular weight 423, contains 5-20% of tetraethylene-pentamine). The membrane crosslinks and exhibits no solubility in hexane, heptane, toluene, xylene, acetone, butanone, methanol, ethanol, isopropanol, tetrahydrofuran, dichloromethane, chloroform, dimethylformamide, dimethylacetamide, N-methylpyrrolidone, dimethyl sulfoxide and ethyl acetate.

The membrane is characterized in a Milipore stirred cell at a pressure of 5 bar. The solvent used is dimethylformamide in which hexaphenylbenzene is dissolved in a concentration of 2.2 mg/l. Measurement revealed a flux of 1.3 l·m$^{-2}$·h$^{-1}$·bar$^{-1}$ coupled with a retention of 89%.

Example 22: Crosslinking a Hollow Fiber Membrane with Amines

The hollow fiber membrane from Example 19 was placed for 16 h into a 0.1% solution of hexamethylenediamine in ethanol. The membrane crosslinks and exhibits no solubility in hexane, heptane, toluene, xylene, acetone, butanone, methanol, ethanol, isopropanol, tetrahydrofuran, dichloromethane, chloroform, dimethylformamide, dimethylacetamide, N-methylpyrrolidone, dimethyl sulfoxide and ethyl acetate.

The invention claimed is:
1. A process for producing a polyimide hollow fiber membrane, the process comprising:
(a) forming a polyimide solution comprising an aprotic dipolar solvent and a polyimide;
(b) filtering and devolatizing the polyimide solution to obtain a casting solution;
(c) pumping the casting solution through a two material die together with a bore solution to produce a polyimide hollow fiber by phase inversion;

(d) treating the polyimide hollow fibers with a dry thermostated gas before entry into an aqueous coagulation bath to produce treated hollow fibers; and (e) dipping the treated hollow fibers into the aqueous coagulation bath to produce the polyimide hollow fiber membrane;

wherein the polyimide is obtained by polymerization of an aromatic dianhydride and an aromatic diisocyanate from a reaction mixture comprising the aprotic dipolar solvent and 0.01 to 5% by weight of a basic catalyst, calculated on the combined amount of aromatic dianhydride, and aprotic dipolar solvent, and has not been isolated as a solid material and then redissolved prior to forming said polyimide solution.

2. The process of claim 1, wherein the polyimide is a polyimide of formula (I):

(I)

R is selected from the group consisting of $0<x<0.5$;
$1>y>0.5$; and n is a number such that a Mp of the polyimide polymer is greater than 100,000 g·mol$^{-1}$.

3. The process of claim 1, further comprising adding a water-soluble additive to the casting solution.

4. The process of claim 3, wherein the water-soluble additive is at least one selected from the group consisting of a water-miscible solvent, a nonsolvent, and a pore-former.

5. The process of claim 1, further comprising crosslinking the polyimide membrane with at least one amine selected from the group consisting of aliphatic diamines, oligoethyleneimine, and polyethyleneimine.

6. The process of claim 5, satisfying at least one condition selected from the group consisting of:

the polyimide membrane is crosslinked with at least one aliphatic diamine selected from the group consisting of diaminoethane, diaminopropane, diaminobutane, diaminopentane, diaminohexane, diaminooctane, diaminodecane, diaminododecane, and bis-4,4'-(aminomethyl)benzene;

the polyimide membrane is crosslinked by dipping into a solution of said at least one amine in water or in at least one alcohol;

the polyimide membrane is crosslinked at a temperature between 0 and 90° C.;

the polyimide membrane is crosslinked for a time between 10 seconds and 16 hours.

7. The process of claim 1, wherein the polyimide hollow fiber produced by phase inversion is an integrally asymmetrically hollow fiber membrane and the process is continuous.

8. The process of claim 1, further comprising at least one condition selected from the group consisting of:

the bore solution comprises a mixture of water and an alcohol with at least one selected from the group consisting of dimethylformamide, dimethylacetamide, N-methylpyrrolidinone, N-ethylpyrrolidinone, sulfolane, and dimethyl sulfoxide; the two-material die is at a distance of 1 to 60 cm from the aqueous coagulation bath of water into which the hollow fiber is spun and an integrally asymmetrical hollow fiber membrane is formed by precipitating the polyimide; and the dry thermostated gas is a thermostated stream of nitrogen or air.

9. A polyimide hollow fiber membrane obtained by the process of claim 1.

10. The polyimide hollow fiber membrane of claim 9, wherein an Mp of the polyimide is greater than 100 000 g·mol$^{-1}$ and a PDI of the polyimide is from 1.7 to 2.3.

11. The polyimide membrane of claim 9, wherein:
the polyimide is a polyimide of formula (II):

(II)

R is selected from the group consisting of $0<x<0.5$;
$1>y>0.5$; and
n is a number such that a Mp of the polyimide polymer is greater than 100,000 g·mol$^{-1}$.

12. The polyimide hollow fiber membrane of claim 9, in the form of:
   a micro-, ultra- or nanofiltration membrane suitable for separating homogeneous dissolved or particulate products from organic solvents or from water; or
   a no-pore membrane suitable for separation of gases.

13. The polyimide hollow fiber membrane of claim 9, wherein the polyimide membrane is an integrally asymmetrical hollow fiber membrane and the integrally asymmetrical hollow fiber membrane is suitable for separating a gas mixture.

14. The polyimide membrane of claim 13, wherein the gas mixture is selected from the group consisting of:
   methane and carbon dioxide;
   oxygen and nitrogen;
   hydrogen and process gases; and
   water vapor and a gas or a mixture of gases other than water vapor.

* * * * *